Feb. 7, 1961　　　G. E. SUDEROW　　　2,970,445
SELF-ENERGIZING MECHANICAL GRIPPERS AND WEDGING RING ASSEMBLY
Filed Feb. 21, 1956　　　　　　　　　7 Sheets-Sheet 4
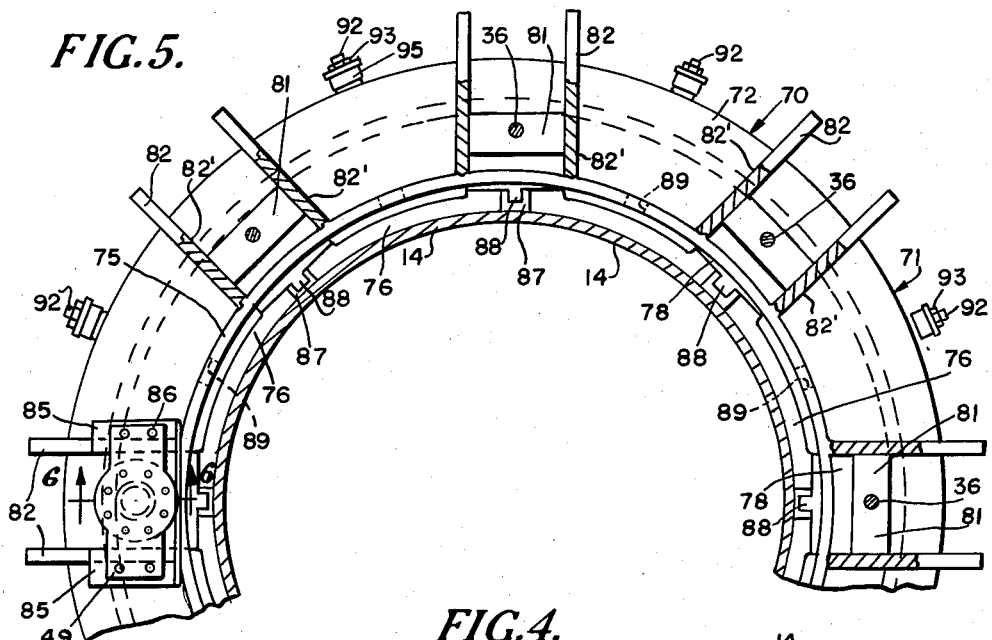
FIG.5.
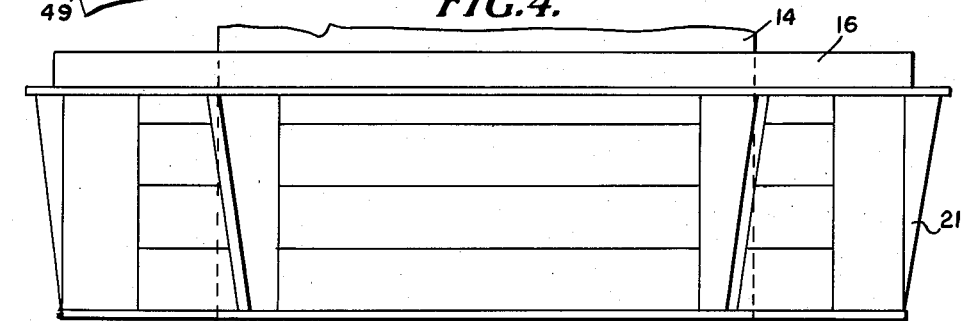
FIG.4.
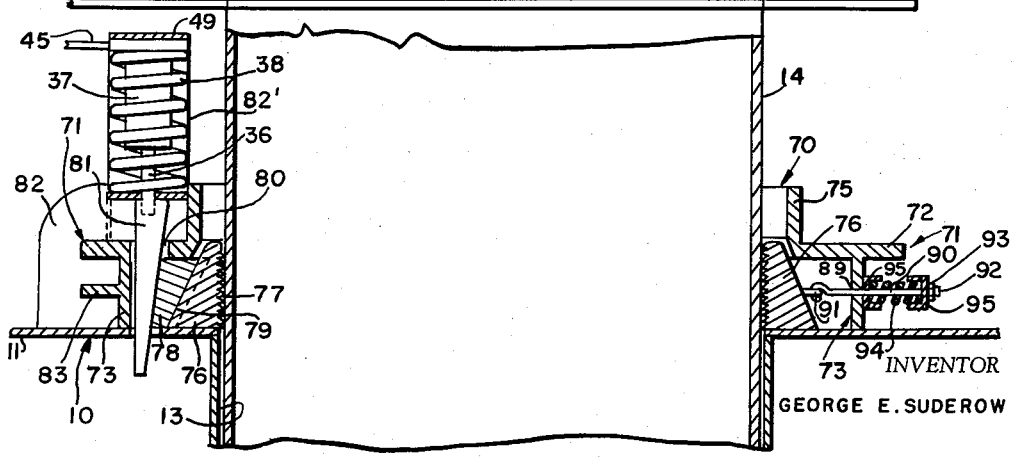
INVENTOR
GEORGE E. SUDEROW
BY Cushman, Darby & Cushman
ATTORNEYS Feb. 7, 1961 G. E. SUDEROW 2,970,445
SELF-ENERGIZING MECHANICAL GRIPPERS AND WEDGING RING ASSEMBLY
Filed Feb. 21, 1956 7 Sheets-Sheet 5
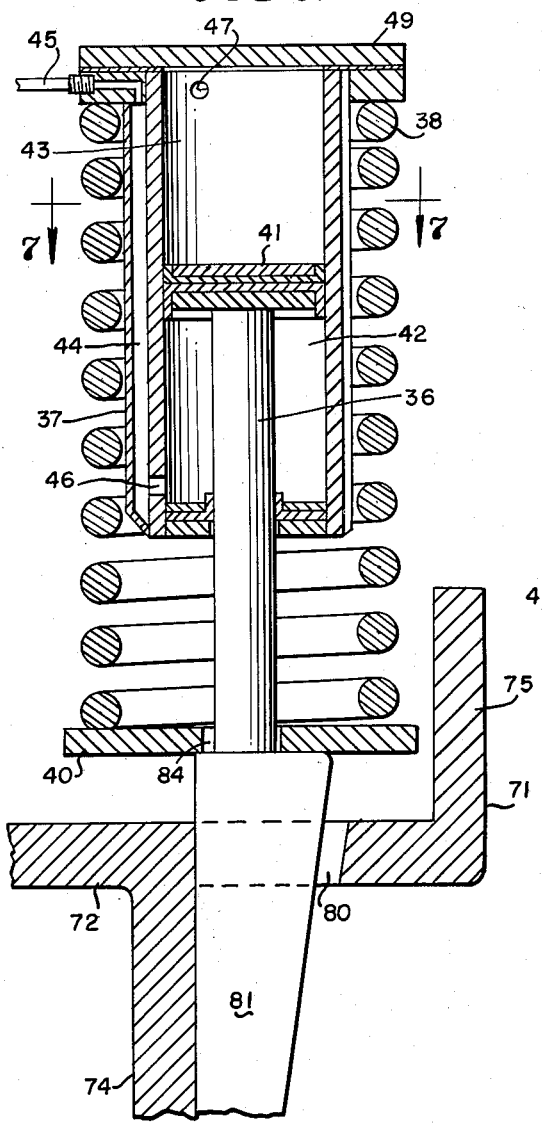
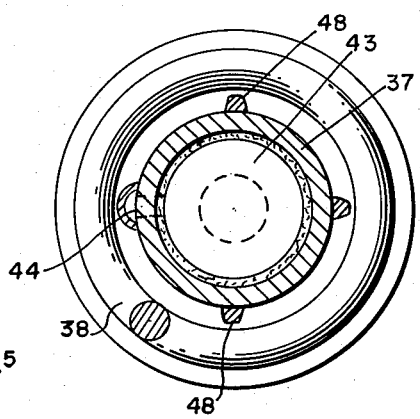
INVENTOR
GEORGE E. SUDEROW
BY *Cushman, Darby & Cushman*
ATTORNEYS

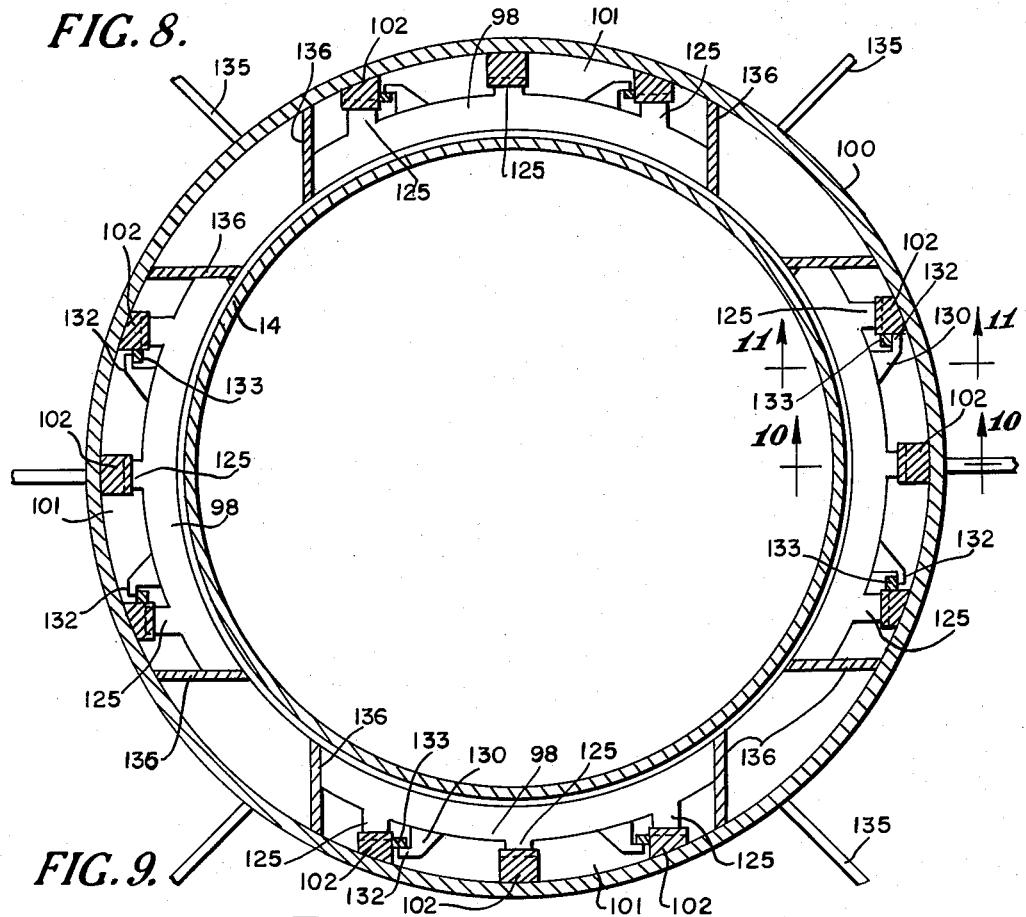
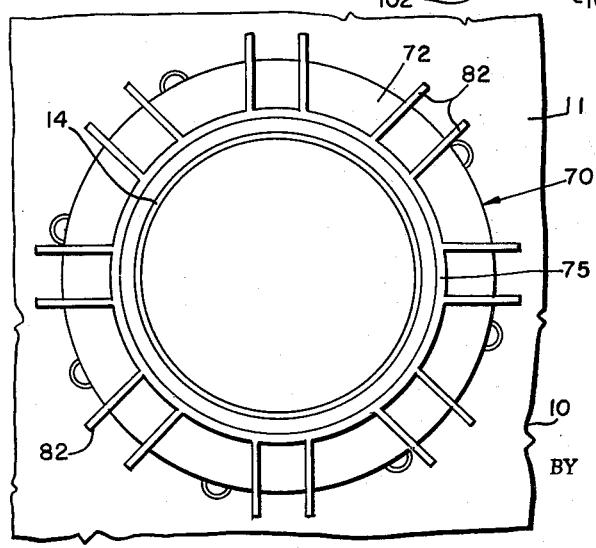

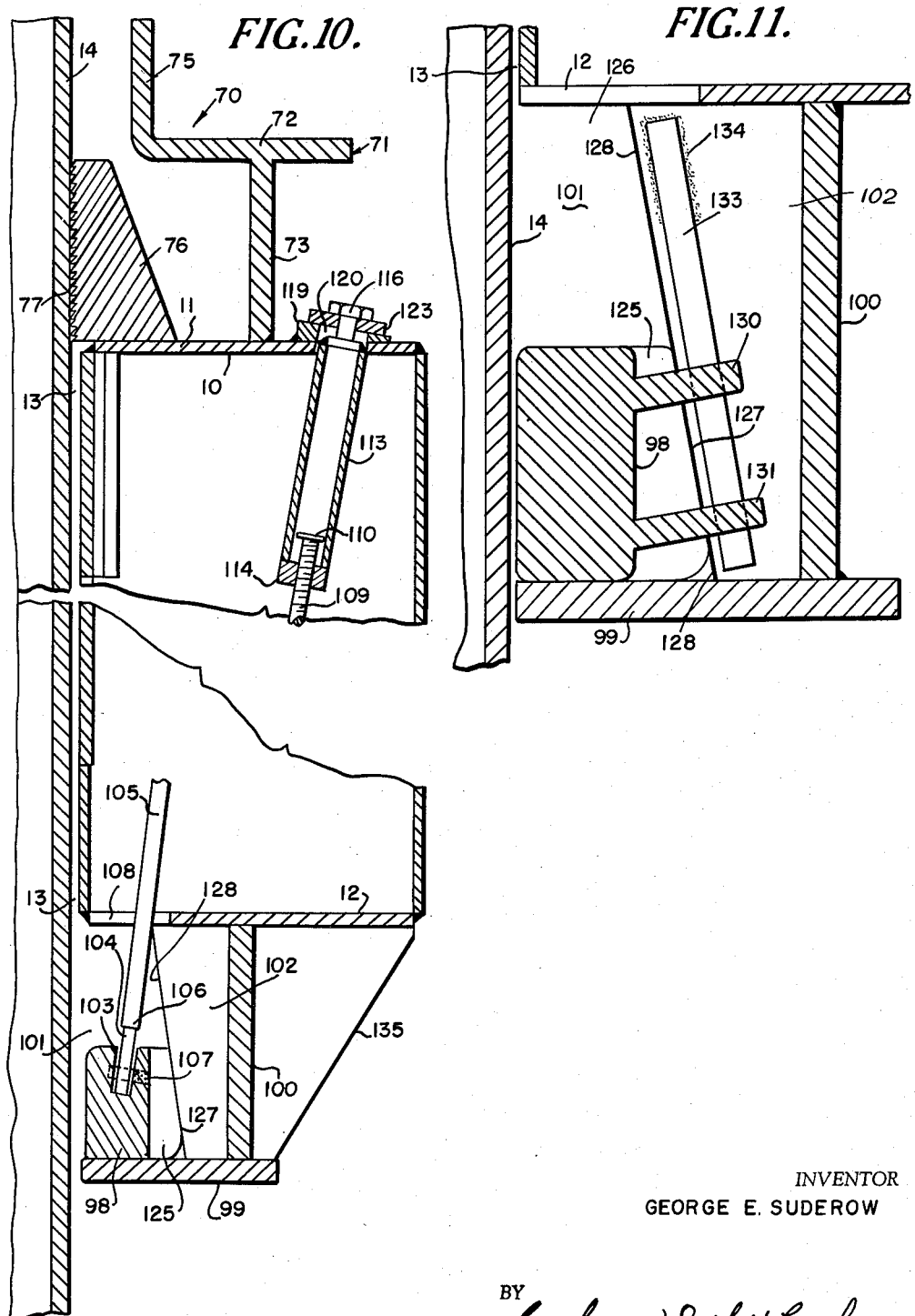

United States Patent Office 2,970,445
Patented Feb. 7, 1961

2,970,445
SELF-ENERGIZING MECHANICAL GRIPPERS AND WEDGING RING ASSEMBLY

George E. Suderow, New York, N.Y., assignor to De Long Corporation, New York, N.Y., a corporation of Delaware Filed Feb. 21, 1956, Ser. No. 566,806
15 Claims. (Cl. 61—46.5)

The present invention relates to an improved gripper assembly arranged to be associated with marine or land columns, poles, posts, uprights, caissons, and the like for releasably connecting a base or working platform to the column.

An important object consists in associating with a combined floating barge and working platform for subaqueous operations, a fluid pressure operated jack mechanism and automatically operable segmental grippers releasably movable into locking engagement with the column or caisson. The grippers are constructed in such a manner that, in the event the pressure in the jack mechanism fails, the grippers are automatically actuated to be moved into locking engagement with the caisson.

A further object consists in associating with a floating barge and supporting caisson or column, a ring assembly spaced axially from the grippers and provided with wedge ring segments or members which coact with the grippers to maintain the barge in a fixed position relative to the caisson and thus prevent horizontal movement or displacement of the caisson relative to the working platform.

Other objects and advantages of the invention will become apparent from the following description when taken in conjunction with the accompanying claims and drawings.

Referring to the drawings in which are shown several preferred embodiments the invention may assume:

Figure 4 is a side view with parts in section of a further form of the invention;

Figure 5 is a detailed sectional plan view of Figure 4;

Figure 6 is an enlarged sectional view taken substantially along the line 6—6 of Figure 5;

Figure 7 is a sectional view taken substantially along the line 7—7 of Figure 6;

Figure 8 is a sectional plan view of a further modification;

Figure 9 is a detailed plan view of the wedging ring assembly of Figure 8;

Figure 10 is an enlarged sectional view taken substantially along the line 10—10 of Figure 8; and Figure 11 is a sectional view taken substantially along the line 11—11 of Figure 8.

Figure 1:
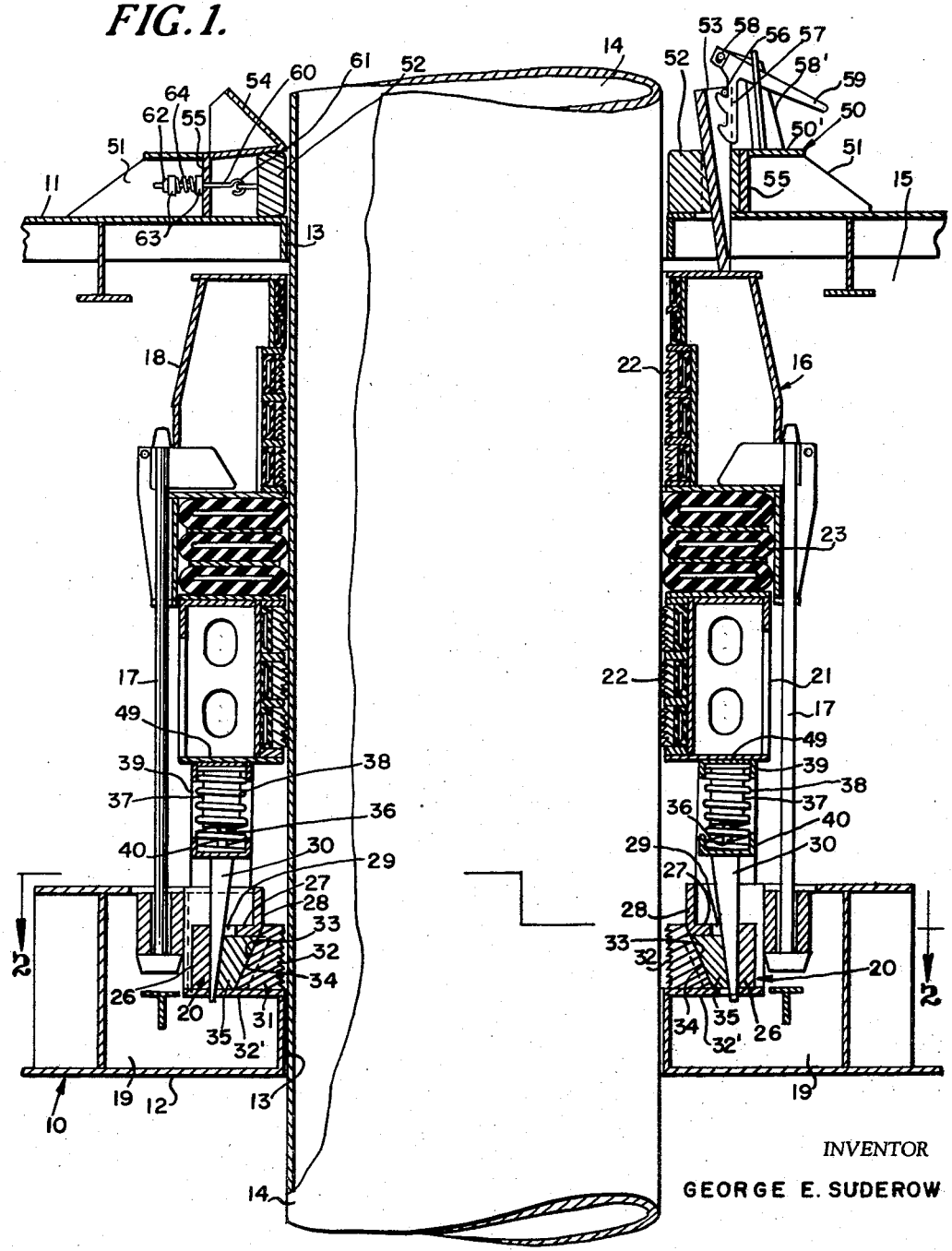
Figure 1 is a fragmentary vertical sectional view of a combined barge and working platform provided with self-energizing mechanical grippers and wedging ring assembly, as embodied in the present invention.

Referring to the drawings, the self-energizing mechanical gripper assembly is shown in one form associated with a combined floating barge and working platform 10, which has a deck or top 11 and a spaced bottom 12 (Fig. 1) provided with aligned well openings 13 for loosely receiving a supporting leg, here shown as a caisson 14. The space between the deck 11 and the bottom 12 of the barge adjacent the well openings 13 is enclosed by bulkheads 13' (Figure 2) to form a substantially square-shaped chamber 15 (Fig. 2), in which is positioned a jack mechanism 16 (Fig. 1), of the type disclosed in U.S. Patent No. 2,775,869. Detachable tie rods 17 releasably connect the upper section 18 of the jack mechanism 16 to radially extending reinforcing webs 19 of a pressure ring 20 positioned below the lower section 21 of the jack and having its webs 19 welded to the bottom 12 of the barge. Each section of the jack is provided with grippers or clamping jaws 22 that are selectively operable by fluid pressure to be moved into releasable locking engagement with the caisson 14. Positioned between the upper and lower sections 18 and 21 of the jack are the vertically expansible bellows 23 which are also operated by fluid pressure, substantially in the manner disclosed in the above-mentioned patent.

Figure 2:
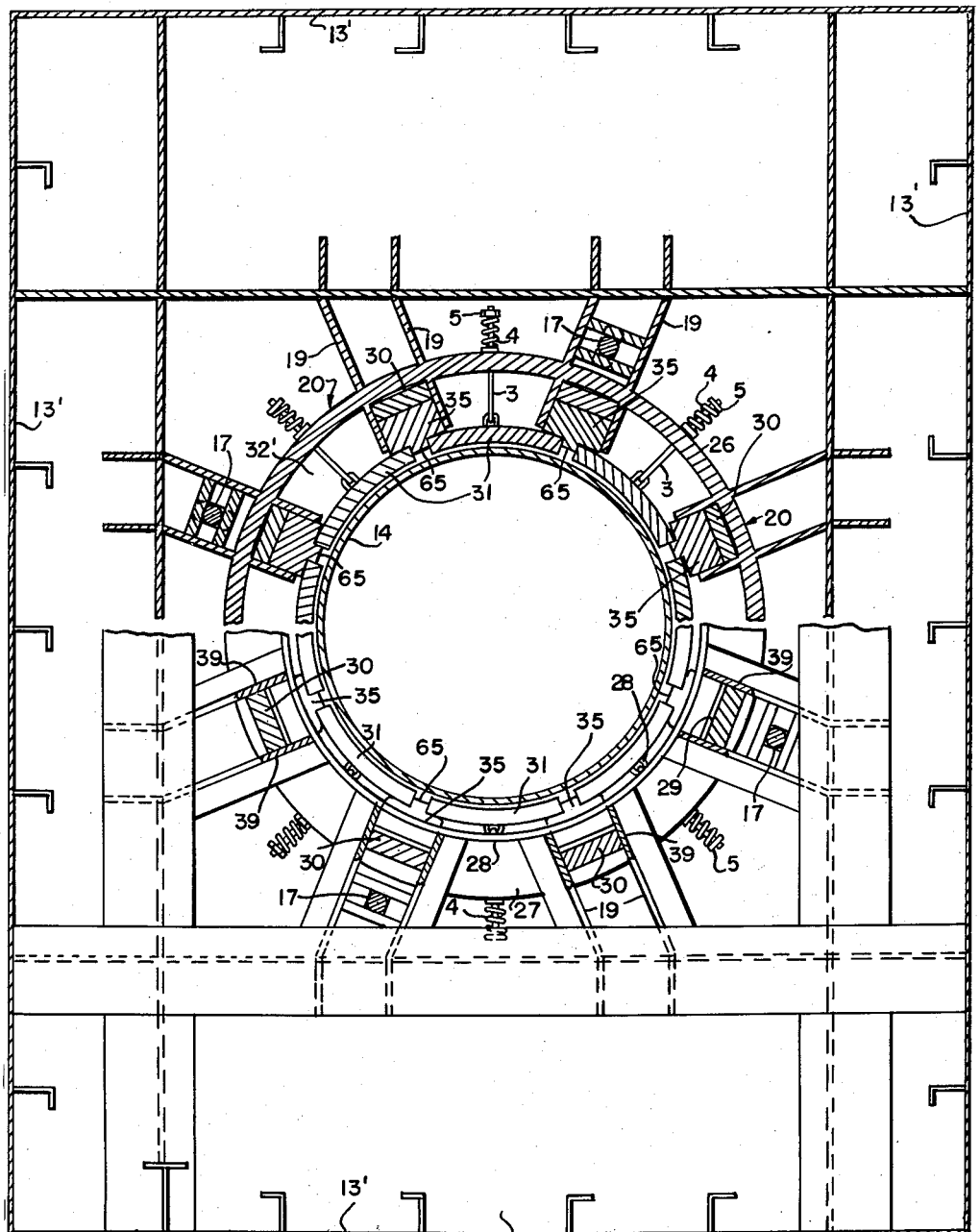
Figure 2 is a sectional view taken substantially along the line 2—2 of Figure 1.

The pressure ring 20, as shown, is of generally Z-shape and has a lower vertical arm 26, a horizontal arm 27, and an upper vertical arm 28 (Fig. 1). The horizontal arm 27 has circumferentially spaced openings 29 through which extend wedges or tapered members 30. Between the caisson 14 and the vertical arm or ring 26 are circumferentially spaced segmental metal grippers or slips 31 having serrated inner surfaces 32 and which rest on an annular flat plate 32' welded to the lower end of the arm 26, so that the slips can be moved radially inwardly into releasable locking engagement with the caisson 14. Each of the slips 31 also has an inclined inner surface 33 at its opposite ends in wedging engagement with a complementary tapered surface 34 on a wedging block 35 which has a tongue 65 protruding between the ends of adjacent slips (Figure 2). The inner face of each block 35 is spaced from the vertical arm 26 of the ring 20, so as to receive the lower end of the vertically reciprocating wedge 30 which extends through the opening 29. While eight of these spaced slips 31 are shown, their number may vary as operating conditions require.

Connected to each of the vertically displaceable wedges 30 (Fig. 1) is the piston rod 36 of a double-acting air cylinder 37 secured to the ring 20 by an inverted generally U-shaped bracket 39. A strong coil compression spring 38 extends around the air cylinder 37 and is confined between the base of the bracket 39 and a cap or plate 40 on top of the wedge 30. As shown in Figure 1, the wedges 30 are in their raised position, so that the slips 31 are moved away from engagement with the caisson 14 by yieldable spring means subsequently to be described. The air cylinder 37 is preferably formed, as shown in Figure 6, and is provided with a piston 41 which separates the cylinder into a lower chamber 42 and an upper chamber 43. The cylinder 37 has a vertical passage 44 substantially co-extensive in length therewith and which at its upper end communicates with a flexible air hose or pipe 45 and at its lower end with a port 46 that communicates with the interior of the lower chamber 42. The flexible hose 45 is connected to the same fluid pressure system that supplies air to the jack mechanism 16 so as to control the flow of the air under pressure to the lower chamber 42. The upper chamber 43 of the cylinder 37 communicates through a port 47 with a flexible hose connection (not shown), so as to control the entrance and discharge of the air under pressure into the chamber 43. The outer wall of the cylinder 37 may be provided with circumferentially spaced ribs 48 (Fig. 7) for preventing the coil spring 38 from contacting the cylinder. The top of the cylinder 37 is closed by a reinforcing plate 49 (Fig. 6). As shown in Figure 1, the plate 49 engages the base of the bracket 39.

Secured to each slip 31 is a pull rod 3 (Figure 2)

which extends outwardly through the arm 26 of the ring 20 and has a coil compression spring 4 interposed between the arm 26 and a head 5 on the rod. The springs 4 constantly urge the slips 31 outwardly out of engagement from the caisson 14.

In operation, when the caisson 14 has been lowered by the jack mechanism 16 to engage the submerged ground, the floating barge 10 and its associated parts are raised by the jack mechanism 16 above the level of the water, so as to convert the barge into a working or drilling platform. While the jack 16 is in operation, the compressed air for such operation also is introduced into the lower chamber 42 of each of the cylinders 37 (Fig. 6) through the passage 44 forcing the piston 41 upwardly into the cylinder, so as to compress the spring 38 and raise the wedge 30. This upward movement releases the pressure on the wedge blocks 35 and the slips 31 are withdrawn from engagement with the caisson 14 (Fig. 1) by the springs 4 and pull rods 3. The caisson is now free to move vertically in the well opening 13. When the barge 10 has reached the desired elevation above the water the supply of air to the chambers 42 is shut off and air is supplied to the upper chambers 43 (Fig. 6). The air pressure in the upper chambers 43 together with the pressure of the external springs 38 forces the pistons 41 downwardly, thus moving the wedges 30 into engagement with the wedge blocks 35 which, in turn, force each of the segmental slips 31 into contact with the caisson 14, so as to prevent movement of the caisson relative to the barge or platform 10.

After the grippers 31 have been applied to the caisson 14, the air pressure is released from the jack mechanism 16, so as to withdraw the jaws 22 from engagement with the caisson 14. When this is done, the load on the barge 10 is transferred from the jack mechanism to the slips 31. Thus, it will be seen that, should for any reason the air pressure in the jack mechanism fail, the resulting reduction of pressure in the chambers 42 of the cylinders 37 would automatically actuate slips 31 to engage the caisson. In other words, by reason of the novel arrangement of parts, means are provided for preventing the accidental dropping of the platform into the water either by human error or by mechanical failure. Moreover, the time required to lock or unlock the slips 31 from the caisson 14 is greatly decreased in comparison with the manually operated grippers or slips as heretofore used. As the segmental slips 31 firmly and uniformly engage the outer circumferential surface of the caisson 14, they prevent lateral or side movement of the barge relative to the caisson, as well as serving to prevent vertical displacement. The wedge blocks 35 are confined on one side by the wedges 30, on the top by the horizontal arm 27 of the pressure ring 20, on the bottom by the plate 32'.

*Wedging ring assembly*

Figure 3:
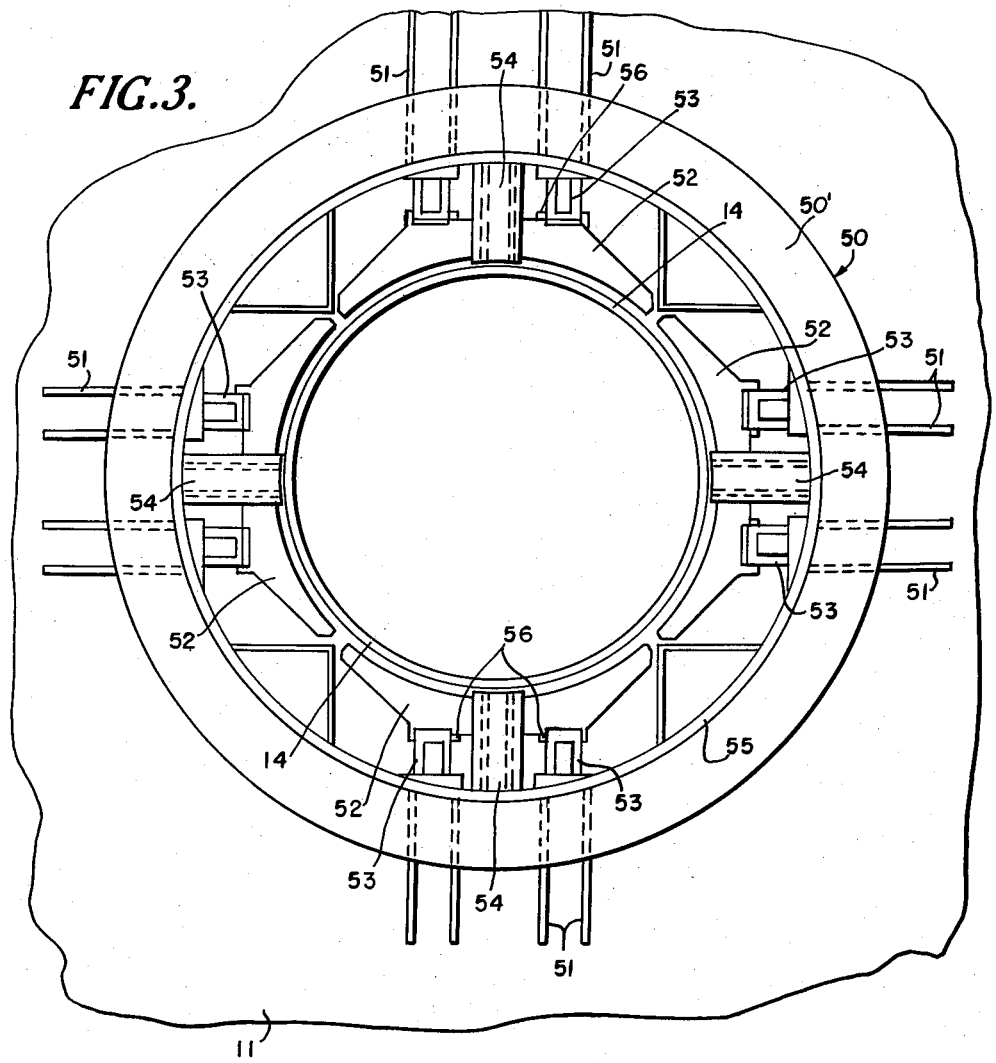
Figure 3 is a detailed plan view with parts removed of the wedging ring assembly.

In order to insure each of the caissons being maintained in a fixed position relative to the barge, without any horizontal movement of the caisson at locations therealong remote from the slips 31, while the latter are engaged with the caisson, means are provided which include a ring or annular member 50 (Fig. 1) having horizontal and vertical webs, 50' and 55, respectively, and spaced pairs of vertical webs 51. The ring 50 is welded to the deck 11 of the barge 10, so as to encircle the upper well opening 13. A plurality of segmental grippers or jaws 52 (Fig. 3) are circumferentially spaced around the top of the well opening 13 between the annular ring 50 and the caisson 14, so as to be moved into and out of engagement with the caisson 14. A pair of spaced channel-shaped wedges 53 are positioned on opposite sides of a caisson-guiding bracket 54 and between the vertical flange 55 of the ring 50 and an adjacent segmental gripper 52. Four spaced brackets 54 are shown for facilitating the entrance of the caisson 14 into the well opening 13. Each of the wedges 53 has a transverse pin 56 adjacent the upper end thereof and arranged releasably to be engaged in one of several notches in a depending retractor arm 57 pivoted, at at 58, to a supporting bracket 58' and having an operating handle 59. The vertical flange 55 of the ring 50 medially of each of segmental grippers 52 is provided with an opening through which extends a bolt 60 (Fig. 1) that is connected at its inner end, as at 61, to a segmental gripper 52 and at its opposite end is threaded to a retaining nut 62. Carried by the bolt 60 are a pair of spaced collars 63 between which is confined a coil spring 64 which provides yieldable means for normally urging the segmental grippers 52 away from the caisson 14 when the wedges 53 are raised or moved away from their associated grippers.

Figure 1 shows the segmental shoes 52 disengaged from the caisson 14 and the wedges 53 raised and held in an elevated position away from the segments 52 by engagement of the pins 56 with a notch in the arm 57. When the wedges are in this position, each caisson 14 may be raised or lowered relative to the barge. Assuming that the platform 10 has been raised above the level of the water by the jack mechanism 16, so as to be converted into a working platform when it reaches the desired elevation, the grippers 31 have been actuated by the downward movement of the wedges 30 to engage the caisson 14. The jacks 16 are then released from the caisson and lowered so as to rest on the brackets 39. The raised barge or platform 10 is now held in its elevated position by the grippers 31. Each of the wedge retractor arms 57 is raised by the manual actuation of the handle 59, so as to release the wedges 53. These wedges are of sufficient weight to fall into contact with the adjacent wall of the segmental wedge grippers 52, so as to force the same into contact with the caisson 14 above the grippers 31. The engaging surfaces of the wedges 53 and the grippers 52 are greased or lubricated to reduce friction and permit the weight of the wedges 53 to force the gripper segments 52 into positive and tight frictional contact with the caisson 14. Thus, it will be seen that the segments 52 are so circumferentially disposed as to engage the caisson around the outer diameter thereof regardless of the position the caisson 14 may assume in the caisson well opening 13. If, for lack of lubrication or for some other unforeseen reason, the gripper segments 52 do not move into contact with the caisson, the weight of the wedges 53 may be supplemented by a few blows of a suitable tool such as a hammer or the like. The wedging ring assembly 50 and its associated parts coact with the mechanical gripper assembly 31 to insure the caissons 14 being maintained in a fixed position relative to the barge or working platform 10, so as to increase the horizontal load-bearing capacity of the caissons. The manually operable caisson wedging ring assembly 50 may be used, as shown, with the mechanical gripper assembly or separately for releasably maintaining a caisson, pile, or column in a fixed position.

To release the wedging segments 52, the bellows 23 of the jack mechanism 16 are inflated to force the upper section 18 of the jack to raise and be moved into contact with the lower end of the wedges 53 (Fig. 1), thus forcing these wedges upwardly and free from engagement with the segmental grippers 52. The retractor springs 64 then function to pull or move the segmental gripper 52 out of contact and away from the caissons 14. As each of the wedges 53 is forced upwardly, the pin 56 falls into a notch in the retractor arm 57, so as to be held clear of the jack mechanism 16. One or more notches may be provided and two are shown, so as to allow for a variation in the stroke of the jack mechanism 16, if so desired.

In the form of the invention shown in Figures 4 to 11, a jack mechanism is positioned above the deck 11 of the barge 10, so that the mechanical gripper assembly, generally indicated by the numeral 70, is positioned between the deck 11 of the barge and the lower section 21 of the jack mechanism 16. An annular member or ring 71 encircles each of the well openings 13 and has a horizontal portion 72 having a depending flange 73 welded to the deck 11. Extending upwardly from the horizontal portion 72 is an upstanding annular flange 75. Segmental grippers or slips 76, substantially similar in shape and construction to the grippers 31 previously described, are provided with serrations 77 on their inner surfaces, which are arranegd to engage the outer surface of a caisson 14. Between each of the grippers 77 and the vertical flange 73 of the pressure ring 71, is a laterally displaceable wedging block 78, which has an inclined surface 79 that abuts a complementary formed inclined surface on the adacent gripper 76. The horizontal portion 72 of the ring 71 has circumferentially spaced openings 80 which receive the elongated vertically movable wedges 81 that extend into the ring member 71 between the vertical flange 73 and an opposed inclined face of each of the wedge blocks 78 (Fig. 4).

The wedge blocks 78 are confined between pairs of vertical webs 82, which are circumferentially spaced around the ring 71. The spaced portions of the ring 71 between each pair of webs 82 may be formed with a lateral reinforcing flange 83 (Fig. 4). Each of the elongated wedges 81 is connected to the piston rod 36 of the air cylinder 37 through an opening 84 (Fig. 6) in the lower cap plate 40 which constitutes a support for the adjacent end of the strong coil spring 38. The top plate or cylinder head 49 of each of the air cylinders 37 is preferably shaped as shown in Figure 5, and rests on lateral flanges 85 carried by extensions 82' of the vertical webs 82 and detachably secured thereto by bolts or screws 86. Each of the segmental grippers 76 is spaced from the adjacent segment to provide a space 87 for the reception of a centrally disposed base 88 (Fig. 5) extending inwardly from each of the wedge blocks 78, so as to provide shoulder portions for engaging the overlapping ends of adjacent segmental grippers 76, in order to force the same into tight frictional engagement with the caisson or column 14.

The annular depending flange 73 of the ring 71 has circumferentially spaced openings 89 (Fig. 5) disposed substantially centrally of each of the segmetnal grippers 76 and through which extend rods 90 connected as at 91 to the adjacent grippers 76. Each of the rods 90 has an outer threaded end 92 to which is connected a retaining nut 93 (Fig. 4). Coil springs 94 are confined between the spaced cup-shaped collars 95 and serve to urge the grippers 76 away from the caisson 14 when the vertical wedges 81 are retracted or raised away from the ring member 71.

The operation of the gripper assembly, when mounted on the deck of the barge, is substantially the same as when it is positioned within the barge (Fig. 1). It will be noted that, when the parts are in their retracted position, as shown in Figure 4, should the pressure for the jack mechanism 16 fail to operate and the latter be released from engagement with the caisson 14, the lack of pressure in the chambers 42 of the cylinders 37 automatically causes the self-energizing of the wedges 81, so as to force the gripper segments 76 into firm, locking engagement with the caisson 14, thus providing means for preventing the dropping of the platform 10 into the water.

A wedging ring assembly for use with the slip assembly shown in Figures 4 and 5 is disclosed in Figures 8 to 11, inclusive. Below the bottom shell 12 of the barge 10 (Fig. 10) is positioned a plurality of wedging segments 98 which are confined between the caisson 14 and a horizontal annular plate 99 and a vertical annular plate 100, which are welded together and also welded to the bottom 12 of the barge, so as to provide housings 101 for each of the segments 98 (Fig. 8). To the vertical curved plate 100 and within each housing are welded three circumferentially spaced radial or transverse wedge-shaped webs or plates 102. Each of the segments 98 has a vertical slot 103 (Fig. 10) into which extends an eyelet 104 connected to the lower end of a vertical rod 105 as at 106, so as to constitute a rigid extension thereof. A transverse locking pin 107 extends through an aperture in each of the segments 98 and through the slot 103, so as to releasably connect the rod 105 to the gripper 98. The rod 105 extends through an elongated opening 108 in the bottom shell 12 of the barge and is provided with an upper threaded portion 109 having a flanged or enlarged head 110. A sleeve or tubular member 113 has secured to its lower end a plug 114 having a threaded opening for receiving the upper threaded portion 109 of the rod 105. The head 110 of the rod 105 extends into the sleeve 113 and, when lowered, abuts the plug 114. A plate 119 having a tapered or inclined upper bearing surface is welded to the deck 11 and provided with a central opening 120 which registers with a corresponding opening in the deck 11. The sleeve 113 extends through the opening 120 and is provided with a non-circular head 116 which bears against a thrust washer 123 resting on the bearing surface of the plate 119.

Each of the segments 98 (Fig. 8) has extending outwardly and radially therefrom circumferentially spaced arms or projections 125. Each of the arms 125 has a tapered or inclined face 127 (Fig. 11) which abuts a complementary inclined portion 128 on an adjacent radial web 102. Each of the end portions of the segment 98 is also provided with an upper laterally extending arm 130 (Fig. 11) and a lower parallel arm 131 of slightly longer length than the arm 130. Each of these arms has an angularly disposed outwardly projecting lugs 132 (Fig. 8) which overlaps an adjacent vertically inclined flange 133, welded as at 134, to the side of the web 102 (Fig. 11), so as to engage the arm 132 and coact therewith, to force the segments 98 away from the caisson 14 when the segments are lowered. The plate 100 may have extending outwardly therefrom spaced reinforcing webs 135. The opposite ends of each segment 98 are confined and guided by spaced transverse webs or plates 136 (Fig. 8).

As shown, four circumferentially spaced segments 98 are provided for maintaining the caisson 14 in a fixed position. Manifestly, this number may be varied as the particular operating conditions and size of the caissons may require.

In operation, after the mechanical grippers 76 are moved in locking engagement with the caisson 14 in the manner, as previously described, the manually operable wedging segments 98 are brought into play by applying a wrench or other tool, to each of the heads 116 and turning the same. The rotation of each of the heads 110 turns the sleeve 113 which is threaded as at 114 to the rod 109, causing the raising of the latter and also the raising of the associated segments 98. As the segments 98 are raised, the wedging contact of the arms 125 with the inclined surfaces 128 of the webs 102 causes each segment 98 to be brought into frictional engagement with the adjacent wall of the caisson 14. To release the segments 98 from the caisson 14, the heads 116 are turned in the opposite direction. It will be seen that, by reason of the tight frictional engagement of the segments 98 with the caisson 14, means are provided for preventing any side motion of the raised barge or working platform relative to the caisson. It will be manifest that the manually operable gripper segments 52 and 98 may be used in association with the automatically operable grippers 31 or 76 or independently thereof.

Thus, it will be seen that simple, positive, efficient, and economical self-energizing mechanical grippers are provided and which are so constructed that, in the event the air pressure in the jack mechanism should fail, these self-energizing grippers are automatically actuated to be moved into locking engagement with the caisson. Further, these grippers may be positioned either within the barge or mounted on the deck thereof. Additionally, manually operable mechanical wedging gripper segments may be associated with the mechanical grippers or used independently thereof. The manual grippers may be positioned on the deck of the barge or below the same, so as to coact with the automatic grippers to lock the barge in a fixed position relative to the caisson when the jack mechanism is released, so as to transfer the load from the jack mechanism to the mechanical grippers to insure the raised barge or platform being maintained in a fixed position, and which also prevents vertical or horizontal movement of the caisson relative to the barge.

Additionally, manually operable segmental grippers are provided for releasable engagement with the caissons either above the barge or below the same for obtaining fiixity between each of the caissons or columns and the barge when the latter is in either its floating or raised position above the water.

It will be understood that the several forms of the invention disclosed are merely illustrative and that such changes may be made as come within the scope of the following claims.

I claim:
1. A platform-like buoyant body having at least one supporting leg mounted for substantially vertical movement relative to said body; fluid pressure operable jack mechanism mounted on said body for effecting and maintaining solely by pressure a releasable grip on said leg and for selectively effecting or restraining substantially vertical step-by-step relative movement beteween said body and said leg; slip means mounted on said body and engageable with said leg for supporting said body thereon independently of the jack mechanism; means for constantly urging said slip means into engagement with said leg; fluid-pressure-operated means for overcoming said urging means to permit said slip means to be moved out of engagement with said leg; and means for supplying pressure fluid to said fluid-pressure-operated means concurrently with, and from the same source as, the supply of pressure fluid to said jack mechanism, whereby should the supply of pressure fluid to said jack mechanism fail, said slip means will automatically engage.

2. The structure defined in claim 1 including resilient means, subordinate to the urging means, for constantly urging the slip means out of engagement with the leg.

3. The structure defined in claim 1 in which the urging means includes movable wedge means engaged with the slip means for moving the latter into engagement with the leg and spring means operable on said wedge means to urge the latter in a direction to move said slip means into engagement.

4. The structure defined in claim 3 including fluid-pressure-operated means operable on the wedge means to supplement the spring means.

5. A platform-like buoyant body having at least one supporting leg mounted for substantially vertical movement relative to said body; jack mechanism mounted on said body for releasably engaging said leg and selectively effecting or restraining substantially vertical relative movement between said body and said leg; an inwardly-facing ring-like channel member secured to said body and surrounding said leg; a plurality of slips mounted in said member and guided thereby for solely substantially radial movement inwardly into and outwardly out of engagement with said leg for supporting said body thereon independently of said jack mechanism; a plurality of wedge blocks mounted in said member behind said slips for movement transversely of said leg, said slips and blocks having inclined mutually engaged wedging surfaces effective to force said slips into tighter engagement with said leg when said slips are engaged therewith and at least a portion of the weight of said body is supported on said blocks; and a plurality of movable wedge means interposed between said blocks and the bottom of said member for forcing said blocks toward said leg on movement of said wedge means in one direction.

6. The structure defined in claim 5 in which each block circumferentially overlaps the adjacent end portions of a pair of adjacent slips and has a nose portion extending between said end portions.

7. The structure defined in claim 5 including retractor spring means connected to each slip and to the member for constantly urging each slip outwardly out of engagement with the leg.

8. The structure defined in claim 7 including double-acting motor means for moving each wedge means.

9. The structure defined in claim 8 including second spring means constantly urging the wedge means in the one direction with a force sufficient to overcome the retractor spring means.

10. In a platform-like buoyant body having at least one supporting leg loosely mounted in a guiding well on the body for substantially vertical movement relative to the body, jack mechanism mounted on the body and releasably engageable with the leg for selectively effecting or restraining substantially vertical relative movement between the body and the leg, and slip mechanism mounted on the body and releasably engageable with the leg for supporting the body thereon independently of the jack mechanism, the combination of means on the body independent of the jack mechanism and spaced from the slip mechanism axially along the leg and engageable therewith when the slip mechanism is engaged to restrain relative lateral movement of the leg in any direction relative to the body, at locations along the leg remote from the slip mechanism.

11. The structure defined in claim 10 in which the means comprises a plurality of ring segments mounted on the body for movement transversely of the leg, rigid means secured to the body in spaced relation to each of said segments laterally of the leg, and wedge means interposed between said rigid means and each of said segments for forcing the latter into engagement with the leg on movement of said wedge means in one direction.

12. The structure defined in claim 11 in which the wedge means are mounted for downward movement in the one direction by gravity and including latch means for retaining said wedge means in an upper inoperative position and retractor spring means secured to the segments and to the rigid means for constantly urging the former out of engagement with the leg.

13. The structure defined in claim 12 in which the jack mechanism has at least an upper section movable axially of the leg, the segments are mounted above said section, and the wedge means, when in their lower operative position, are engageable by said section to lift said wedge means to their inoperative position.

14. In a platform-like buoyant body having at least one supporting leg loosely mounted in a guiding well on the body for substantially vertical movement relative to the body, jack mechanism mounted on the body and releasably engageable with the leg for selectively effecting or restraining substantially vertical relative movement between the body and the leg, and slip mechanism mounted on the body and releasably engageable with the leg for supporting the body thereon independently of the jack mechanism, the combination of means on the body independent of the jack mechanism and spaced from the slip mechanism axially along the leg and engageable therewith when the slip mechanism is engaged to restrain relative lateral movement of the leg in any direction relative to the body at locations along the leg remote from the slip mechanism, said means comprising a plurality of ring segments mounted on the body for movement into engagement with the leg, rigid means secured to the body and engaged with said segments, the mutually engaged surfaces of said segments and rigid means being inclined to force said segments into engagement with the leg on upward movement of the former, and manually-operable means for moving each of said segments upwardly.

15. The structure defined in claim 14 including interengaging means on the segments and on the rigid means to move the former away from the leg on downward movement of said segments from a leg-engaged position.

References Cited in the file of this patent

UNITED STATES PATENTS

| | | |
|---|---|---|
| 1,389,867 | Griffin | Sept. 6, 1921 |
| 1,494,585 | Burns et al. | May 20, 1924 |
| 2,109,546 | McLagan | Mar. 1, 1938 |
| 2,212,572 | McCarthy | Aug. 27, 1940 |
| 2,507,127 | True | May 9, 1950 |
| 2,508,835 | Moon et al. | May 23, 1950 |
| 2,715,013 | Slick | Aug. 9, 1955 |
| 2,717,663 | Higgins | Sept. 13, 1955 |
| 2,830,788 | Bentley et al. | Apr. 15, 1958 |

FOREIGN PATENTS

| | | |
|---|---|---|
| 713,298 | Great Britain | Aug. 11, 1954 |